United States Patent [19]

Shearn

[11] Patent Number: 5,201,298
[45] Date of Patent: Apr. 13, 1993

[54] COMBINATION SENDING UNIT AND FUEL DRAW AUTOMATIC SHUTOFF VALVE

[75] Inventor: Kenneth M. Shearn, Maple Valley, Wash.

[73] Assignee: Paccar Inc., Bellevue, Wash.

[21] Appl. No.: 813,993

[22] Filed: Dec. 27, 1991

[51] Int. Cl.⁵ ............... F02B 77/00; F16K 31/18; F16T 1/20
[52] U.S. Cl. ............... 123/514; 137/558; 137/192; 137/433; 123/198 DB
[58] Field of Search ............... 123/198 DB, 509, 514; 137/433, 554, 556, 558, 192; 251/65

[56] References Cited

U.S. PATENT DOCUMENTS

| | | | |
|---|---|---|---|
| 3,467,135 | 9/1969 | Muskalla | 137/433 |
| 3,595,267 | 7/1971 | Anderson | 137/558 |
| 3,888,274 | 6/1975 | Weston | 137/433 |
| 4,132,238 | 1/1979 | Clark | 137/192 |
| 4,300,489 | 11/1981 | Perrin | 123/65 |
| 4,306,579 | 12/1981 | Kelly | 137/558 |
| 4,672,937 | 6/1987 | Fales et al. | 123/514 |
| 4,715,345 | 12/1987 | Reames, Jr. | 137/433 |
| 4,724,860 | 2/1988 | Kelch | 123/433 |
| 4,763,633 | 8/1988 | Nakanishi | 123/514 |
| 4,831,990 | 5/1989 | Tuckey | 123/514 |
| 4,928,657 | 5/1990 | Asselin | 123/514 |
| 4,930,537 | 6/1990 | Farmer | 123/514 |
| 4,974,570 | 12/1990 | Szwargulski et al. | 123/514 |
| 5,020,566 | 6/1991 | Shoop | 137/192 |
| 5,050,567 | 9/1991 | Suzuki | 123/514 |
| 5,095,880 | 3/1992 | Ricks | 123/198 DB |
| 5,114,115 | 5/1992 | Gillott | 123/198 DB |

Primary Examiner—E. Rollins Cross
Assistant Examiner—Thomas Moulis
Attorney, Agent, or Firm—Seed and Berry

[57] ABSTRACT

A combination draw valve and sending unit assembly includes a draw valve assembly and sending unit assembly. The draw valve assembly is constructed for drawing fuel from a fuel tank of a truck or other motor vehicle. The draw valve assembly includes an adapter valve and a float valve constructed for automatically closing so that no fuel can be withdrawn from the fuel tank when the fuel level in the tank is low. The sending unit assembly inlcudes a potentiometer and a magnetic contact wherein the magnetic contact is coupled to the float valve for providing an electrical signal indicative of the amount of fuel remaining in the fuel tank.

12 Claims, 5 Drawing Sheets

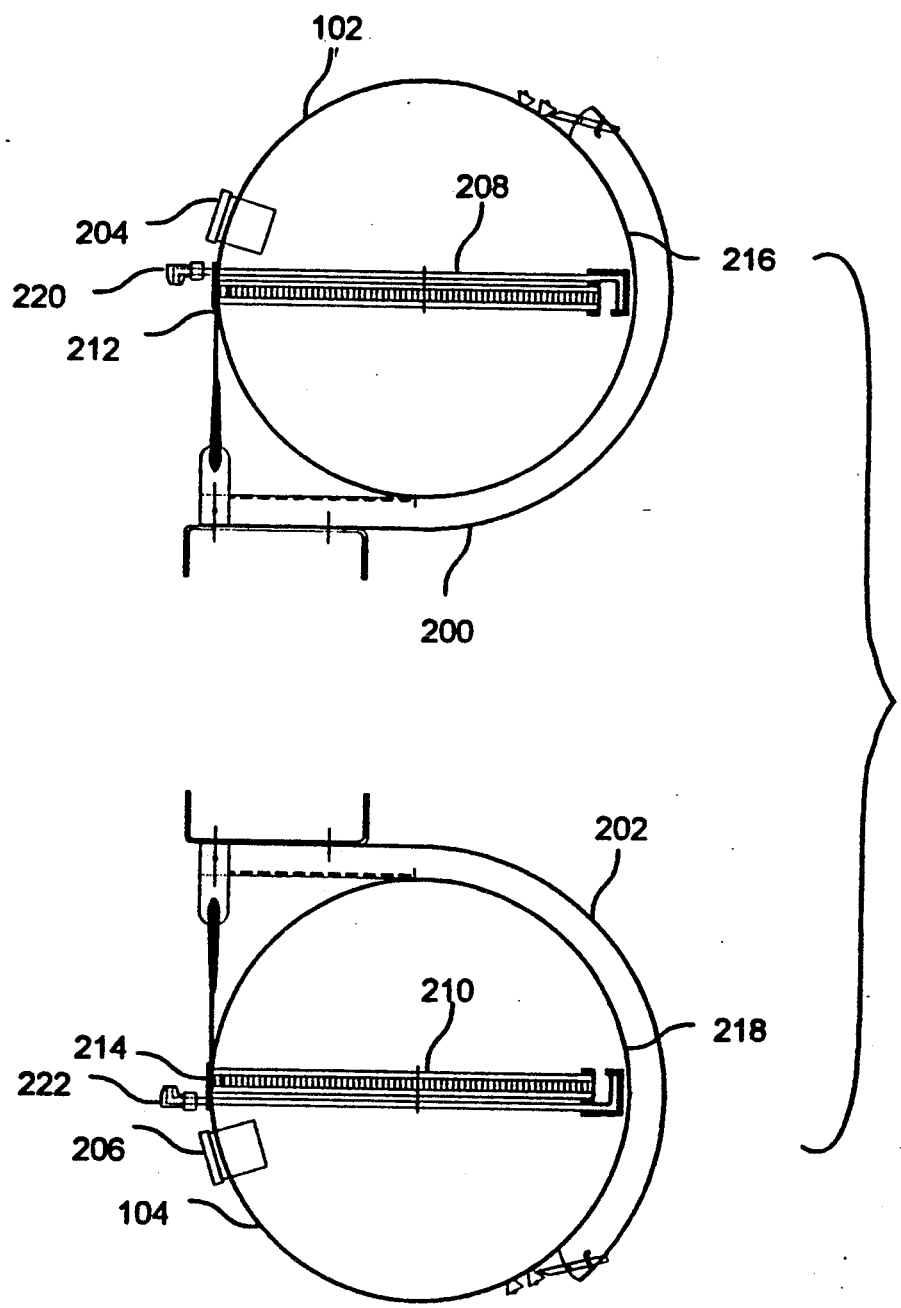

COMBINATION SENDING UNIT AND FUEL DRAW AUTOMATIC SHUTOFF VALVE

TECHNICAL FIELD

The present invention is directed toward a fuel tank system for a truck or other vehicle and, more particularly, toward a combination draw valve and sending unit assembly for providing an electrical signal indicative of the amount of fuel remaining in a fuel tank of a truck and for automatically shutting off the supply of fuel when the fuel level is low.

BACKGROUND OF THE INVENTION

Large diesel powered trucks and other vehicles often include multiple fuel tank systems that employ two or more fuel tanks. It is generally undesirable for air to be drawn into the truck engine of either a single or multiple fuel tank system. This is particularly so when operating a diesel engine since air in the diesel engine can create considerable difficulty for the operator to seal the air leak and re-initiate suction of flow of fuel to the diesel engine. If the engine on a large truck, such as a tractor-trailer truck, for example, is deprived of fuel while under way, it will stop the engine and damage the fuel pump. Most commonly, air is drawn into the fuel tank system as a result of depletion of the liquid fuel in the fuel tanks. Accordingly, it is desirable to provide apparatus to prevent introduction of air into the fuel line of a fuel tank system.

Still further, with multiple fuel tanks, it is desirable to use as much fuel from both tanks as possible, thereby to maximize the benefit of providing multiple fuel tanks. However, for a variety of reasons the fuel level in the two tanks may not be equal and, therefore, it may be possible to draw air into the fuel line as a result of one tank being depleted of fuel while the other tank still has a substantial amount of fuel. Accordingly, it is particularly advantageous to provide a system for preventing the introduction of air into the fuel line of a multiple fuel tank system.

One prior art fuel transfer system attempts to maintain the fuel levels in both tanks substantially constant, so that the maximum amount of fuel can be drawn from both tanks without drawing air into the engine. The fuel transfer system usually includes crossover lines coupled to the bottom walls of the tanks. Since the fuel flow between tanks depends on gravity, the crossover lines are typically the lowest point on the fuel tanks.

However, since these crossover lines are generally the lowest parts of the vehicle, they are susceptible to accidental breakage due to debris on the highway or other obstructions that may impact against the below-tank crossover line. Breakage in a fuel tank results not only in accidental loss of the liquid fuel contained in the fuel tank but also represents a safety and environmental hazard. Accordingly, multiple fuel tank systems of this type are undesirable.

SUMMARY OF THE INVENTION

The present invention provides an improved fuel tank system for a vehicle wherein the vehicle is of the type having a combustion engine for consuming a liquid fuel to provide motivating energy to the vehicle. The fuel tank system includes one or more fuel tanks for storing the liquid fuel. The fuel tank system includes a draw stem and fuel lines for conducting the liquid fuel from the draw stem to the combustion engine. The fuel tank system also includes a combination draw valve and sending unit assembly coupled to the draw stem for regulating the flow of the liquid fuel to the draw stem and for providing an electrical signal indicative of the amount of the liquid fuel remaining in the fuel tank(s). The combination draw valve and sending unit assembly is constructed for automatically blocking the flow of the liquid fuel to the draw stem before all of the liquid fuel in the fuel tank(s) is withdrawn so that air will not be drawn into the combustion engine.

BRIEF DESCRIPTION OF THE DRAWINGS

FIG. 2 is a more detailed illustrative diagram of a two-tank fuel system including the novel combination draw valve and sending unit that is the subject of the subject invention;

DETAILED DESCRIPTION OF THE INVENTION

Figure 1:
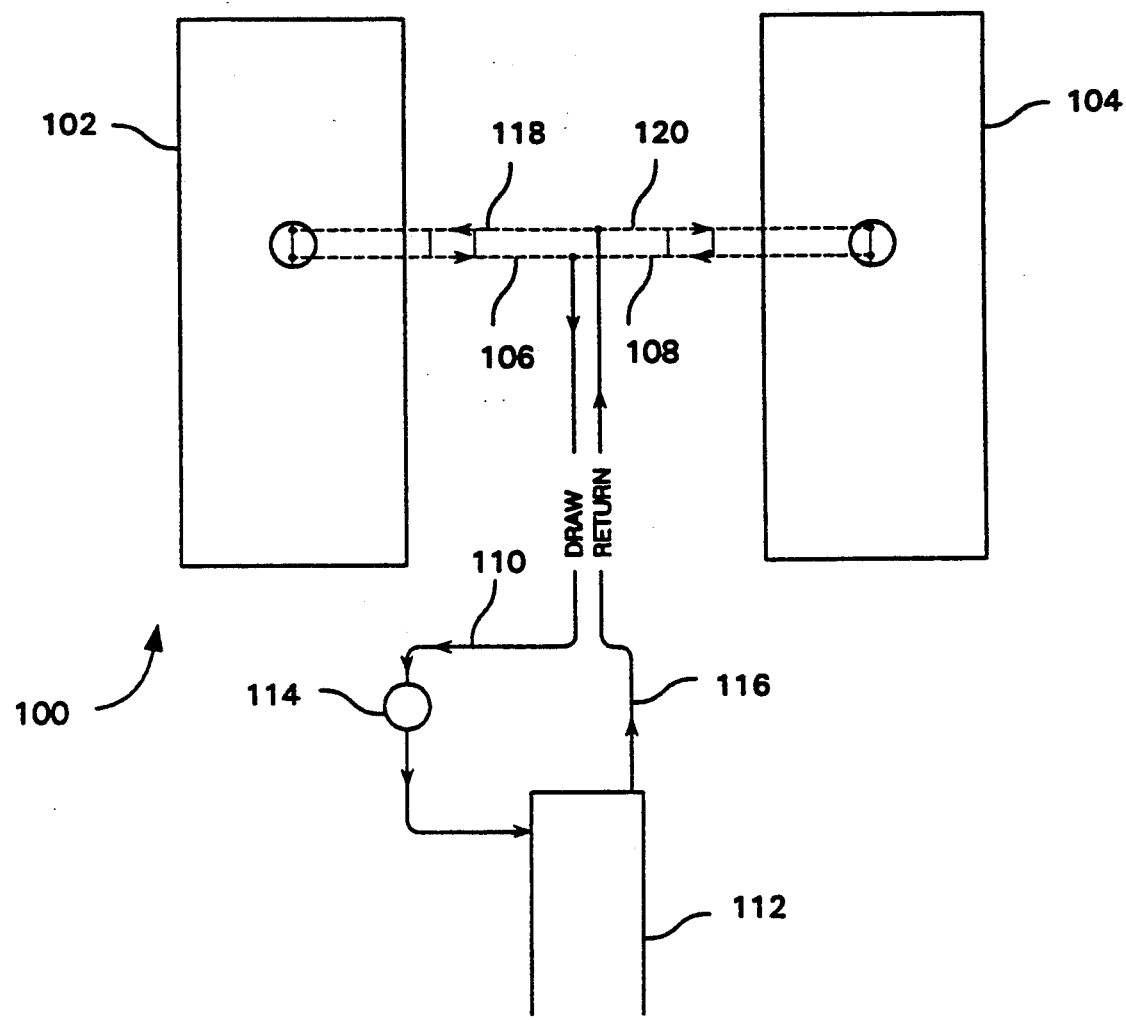
FIG. 1 is an illustrative diagram of a two-tank fuel system.

A multiple fuel tank system 100, illustrated in FIG. 1, includes two fuel tanks 102 and 104. Each of the fuel tanks 102 and 104 may comprise apparatus commonly supplied for containing the liquid fuel of a truck or other motor vehicle. Two draw tubes 106 and 108 are coupled respectively to the two fuel tanks 102 and 104 for conducting liquid fuel from the fuel tanks to a main draw line 110. The main draw line is coupled for providing the liquid fuel to an engine 112 of the truck via a fuel pump 114. In the presently preferred embodiment of the invention the engine 112 comprises a diesel engine for the tractor of a tractor-trailer. The diesel powered engine 112 includes apparatus for returning unused fuel to the fuel tank system 100, as is known in the art. To this end, a main return line 116 is coupled for conducting unused liquid fuel from the engine 112 to two return tubes 118 and 120. The two return tubes 118 and 120 are coupled to the fuel tanks 102 and 104 for returning unused liquid fuel thereto.

With reference to FIG. 2, the two fuel tanks 102 and 104 are each suitably mounted to the truck by respective bracket assemblies 200 and 202. Two conventional fuel caps 204 and 206 are provided for the fuel tanks 102 and 104, respectively. In accordance with the subject invention, each fuel tank 102 and 104 includes a combination draw valve and sending unit assembly 208 and 210, respectively, for regulating the flow of the liquid fuel to the combustion engine 112 and for providing an electrical signal indicative of the amount of fuel remaining in the fuel tanks 102 and 104. The combination draw valve and sending unit assemblies 208 and 210 are each mounted to a top portion 212 and 214 of the fuel tanks 102 and 104, respectively. The combination draw valve and sending unit assemblies 208 and 210 extend into the fuel tanks 102 and 104 toward respective bottom portions 216 and 218. The fuel tanks 102 and 104 further include draw stems 220 and 222 coupled to the top portions 212 and 214 thereof, for coupling the combination draw valve and sending unit assemblies 208 and 210 to the draw tubes 106 and 108, respectively.

Figures 3A, 3B:
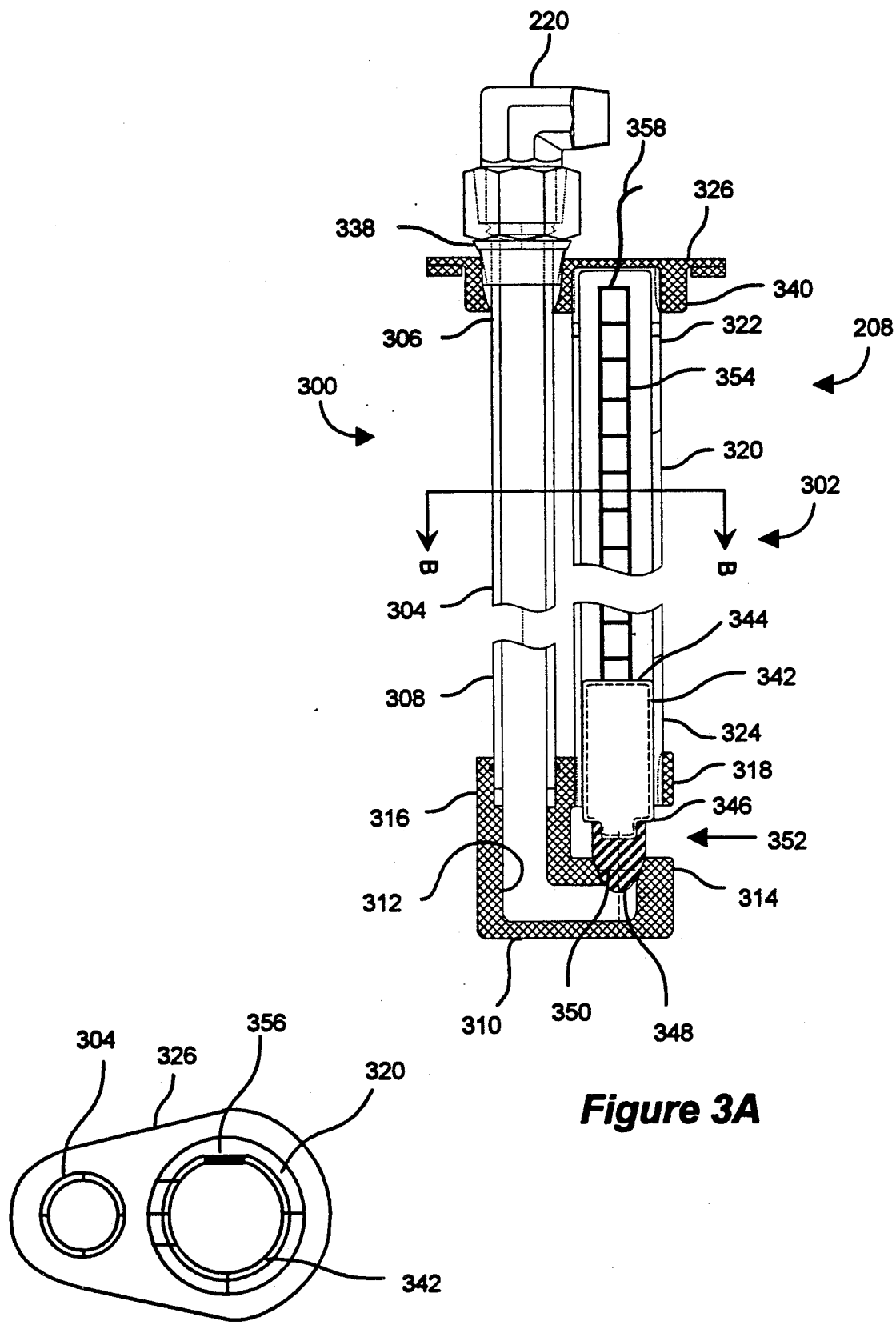
FIGS. 3A and 3B are more detailed diagrams of the combination draw valve and sending unit that is the subject of the present invention.

A more detailed illustrative diagram of the combination draw valve and sending unit assembly 208 is provided in FIG. 3. It will be apparent to those skilled in the art that the combination draw valve and sending unit assembly 210 is constructed in accordance with the following description of the combination draw valve and sending unit assembly 208. The combination draw valve and sending unit assembly 208 includes a draw valve assembly 300 and a sending unit assembly 302. The draw valve assembly has a draw tube portion 304 having first and second ends 306 and 308, respectively. The first end 306 is coupled to the draw stem 220 for conducting liquid fuel from the draw tube portion 304 to the draw stem 220. The second end 308 extends toward the bottom portion 216 of the fuel tank 102 as illustrated in FIG. 2.

An adapter valve 310 is coupled to the second end 308 for conducting liquid fuel from the fuel tank 102 to the draw tube portion 304. The adapter valve 310 comprises a substantially U-shaped member having a liquid flow channel 312 extending from a first end 314 to a second end 316. The adapter valve 310 also includes a spacing portion 318 coupled to the draw valve assembly 300 and the sending unit assembly 302 for positioning the sending unit assembly with respect to the draw valve assembly so that the sending unit assembly is substantially in vertical alignment with the first end 314. The second end of the adapter valve 310 includes a seat portion 350 that is spaced from the positioning portion 318 to define an inlet 352 for conducting the liquid fuel from the fuel tank 102 to the adapter valve 310.

The sending unit assembly 302 includes a float tube 320 having a first end 322 mounted to the top portion 212 of the fuel tank 102. A second end 324 is mounted to the spacing portion 318 for positioning the float tube 320 in vertical alignment with the adapter valve 310. A float valve 342 is positioned interior of the float tube 320 and includes a floating portion 344 and a submerged portion 346. The float valve is constructed for floating substantially atop the liquid fuel contained in the fuel tank 102 so that the submerged portion 346 is in contact with the liquid fuel. A stopper 348 is mounted to the submerged portion 346 and is constructed to seat within the seat portion 350.

A bracket 326 is provided for mounting the combination draw valve and sending unit assembly 208 to the fuel tank 102. The bracket 326 includes first and second channels for receiving the draw tube portion 304 and float tube 320, respectively. The first and second channels 338 and 340 are spaced so that when the draw tube portion 304 and float tube 320 are mounted in the mounting portion 326 and adapter valve 310 the draw tube portion 304 and float tube 320 are substantially parallel.

The float tube 340 also includes a linear potentiometer 354 mounted along the length of the float tube 320 and positioned to be proximate the float valve 342. The float valve 342 includes a magnetic contact 356 that is mounted proximate the linear potentiometer 354. As is known in the art, the magnetic contact 356 cooperates with the linear potentiometer 354 to provide an electrical signal via a conductor 358 wherein the electrical signal is indicative of the amount of liquid fuel remaining in the fuel tank.

In operation, the float valve 342 floats substantially atop the liquid fuel in the fuel tank so that when the amount of the liquid fuel is above the inlet 352, liquid fuel is permitted to flow into the adapter valve 310 and be drawn from the fuel tank 102 via the draw stem 220. The potentiometer 354 and magnetic contact 356 provide an electrical signal to the conductor 358 wherein the electrical signal is indicative of the position of the float valve 324. Since the float valve 324 is constructed to float substantially atop the liquid fuel in the fuel tank 102, the electrical signal is also indicative of the amount of liquid fuel remaining in the fuel tank. As the amount of liquid fuel approaches the inlet 352, the stopper 348 engages and seats within the seat portion 350 to automatically close the adapter valve 310 thereby preventing further withdrawal of the liquid fuel from the fuel tank 102. Preferably, the inlet 352 is positioned substantially proximate the bottom portion 316 of the fuel tank 102 so that the maximum amount of the liquid fuel can be withdrawn from the fuel tank 102 before the draw valve assembly 300 closes. With this operation, the draw valve assembly 300 closes before all of the liquid fuel is withdrawn from the fuel tank 102 so that no air will be conducted to the engine 112 of the truck.

Figure 4A:
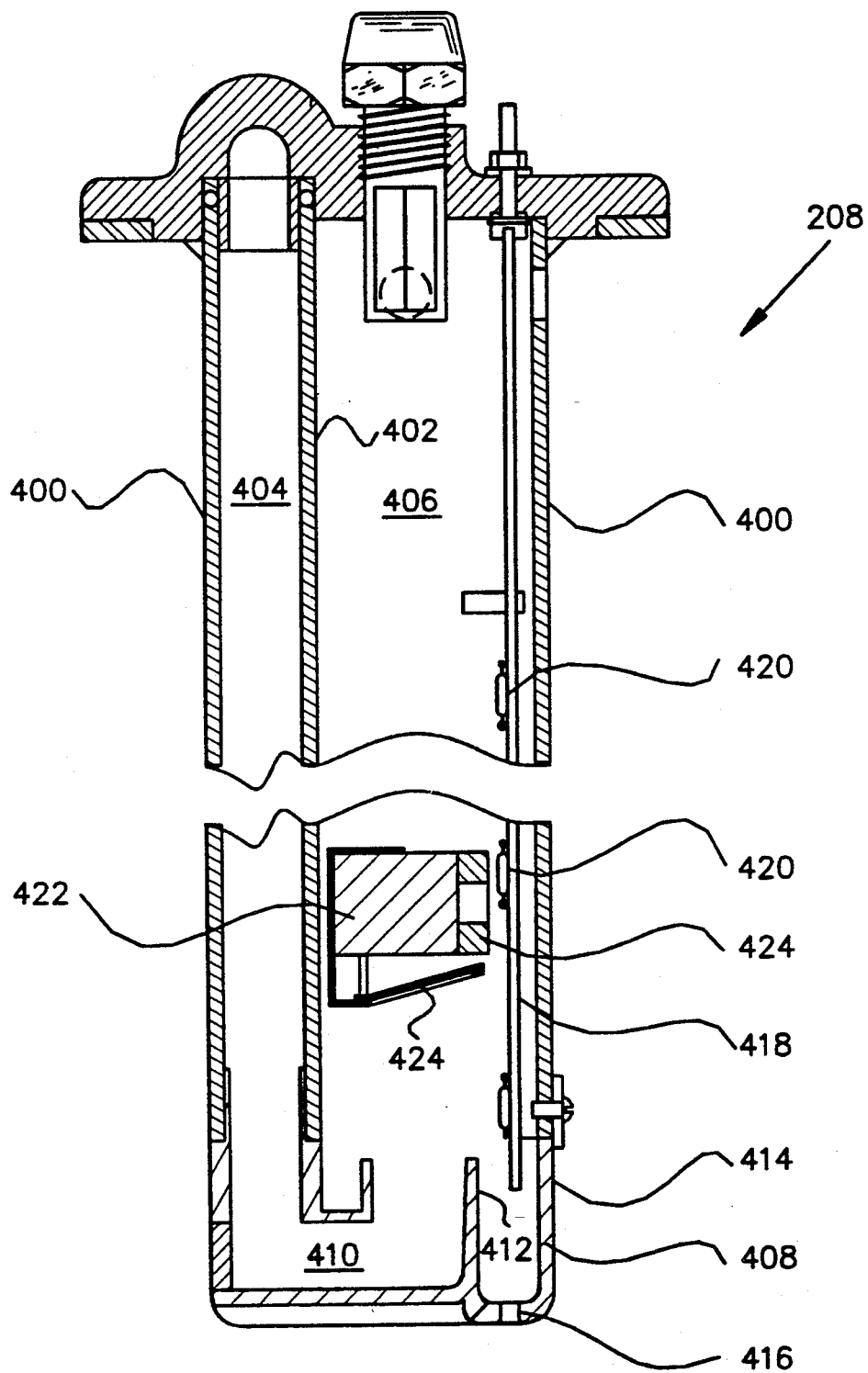
FIGS. 4A and 4B are more detailed diagrams of an alternative embodiment for the combination draw valve and sending unit that is the subject of the present invention.
Figure 4B:
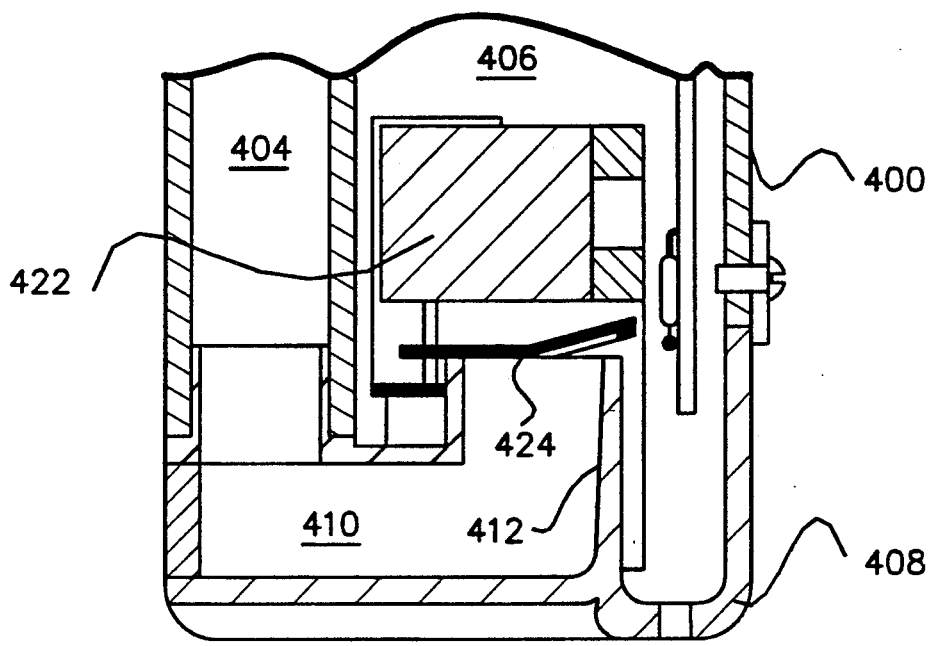

An alternative embodiment for the combination draw valve and sending unit 208 is illustrated in FIGS. 4A and 4B. Therein, the combination draw valve and sending unit 208 includes an integral body portion 400 having an inner wall 402 that defines a draw tube chamber 404 and a sending unit chamber 406. The housing 400 further includes a seat assembly 408 mounted to the bottom thereof. The housing 400 is constructed to be positioned within the fuel tank 102, proximate the bottom portion 216, as illustrated in FIG. 2. The seat assembly portion 408 includes a liquid flow channel 410 for conducting liquid fuel from the float valve chamber 406 to the draw tube chamber 404. The seat assembly 408 also includes a seating portion 412 defining an open end for the liquid flow channel 410.

The body 400 further includes a drain portion 414 including a drain hold 416. The drain hole is provided for permitting liquid fuel to flow into and out of the combination draw tube and sending unit 208.

The sending unit chamber 406 includes a printed circuit board 418 having a plurality of switches 420 mounted thereon. A float valve 422 includes a magnet 424 wherein the magnet is mounted proximate the printed circuit board 418 to be magnetically coupled to the plurality of switches 420. The float valve 422 is constructed to float substantially atop the liquid fuel in the sending unit chamber 406. Those skilled in the art will appreciate that as the float valve 422 rises and falls with the level of liquid fuel in the sending unit chamber 406, the magnetic coupling between the magnet 424 and the switches 420 will cause individual ones of the switches 420 to close, thereby providing an electrical signal indicative of the level of fuel in the tank 102.

The float valve 422 includes a stopper 424 mounted to the bottom thereof. The stopper 424 is constructed for mating with the open end 412 of the liquid flow channel 410. Those skilled in the art will appreciate that when the level of liquid fuel in the tank becomes low, the float valve 422 will approach the bottom of the sending unit chamber 406 so that the stopper 424 will mate with the open end 412, as best illustrated in FIG. 4B. Advantageously, the stopper 424 rests upon the open end 412 and seals the open end by the weight of the float valve 422. When sealed, liquid fuel remaining in the fuel tank 102 is prevented from being withdrawn so that no air is introduced to the engine 112 as discussed above by reference to FIGS. 1-3. Since the stopper is constructed to seal the open end 412 by resting thereupon, it is easily unsealed when the float valve 422 rises due to a rise in the level of liquid fuel in the tank 102. The construction of the float valve 422 shown in FIGS. 4A and 4B is therefore less likely to get stuck in the closed position when the fuel tank 102 is filled.

When used with dual fuel tank installations, the draw valve of the subject invention provides for automatic selection of the fuel tanks 102 and 104 by shutting off the fuel supply of the tank that is empty first and allowing the other fuel tank to be used without any operator involvement. This eliminates the need for a fuel crossover line. This also eliminates the need for symmetry in the dual tank fuel draw lines. Equal length draw lines were previously used in an effort to have the tanks draw down equally when used without a crossover. Equal length lines are not reliable due to the flow characteristics of the fuel taking the path of least resistance due to fuel line routing, line swell, fitting quality and the possibility for air bubbles due to fuel aeration to settle in high spots in the fuel line causing a restriction. Accordingly, the subject invention represents a significant improvement over the prior art device.

It will be appreciated that, although specific embodiments of the invention have been described herein for purposes of illustration, various modifications may be made without departing from the true spirit and scope of the invention. Accordingly, the invention is not limited except as by the appended claims.

What is claimed is:

1. A fuel tank system for a vehicle wherein the vehicle is of the type having a combustion engine for consuming a liquid fuel to provide motivating energy to the vehicle, said fuel tank system comprising:

first and second fuel tanks each constructed for storing the liquid fuel, said first and second fuel tanks having top and lower portions;

main draw line means connected for conducting fuel to the combustion engine;

first and second draw tubes each including first and second ends, said first ends of said first and second draw tubes each coupled to said main draw line means for conducting the liquid fuel from said first and second fuel tanks to said main draw line means;

main return line means connected for conducting fuel from the combustion engine;

first and second return tubes each including first and second ends, said first ends of said first and second return tubes each coupled to said main return line means, said second ends of said first and second return tubes being mounted respectively to said top portion of said first and second fuel tanks to extend interior of said first and second fuel tanks and terminating in a free end for conducting the liquid fuel from said main return line means to said first and second tanks;

first and second sending unit assemblies mounted respectively to said top portion of said first and second fuel tanks, said first and second sending unit assemblies including respective first and second draw tube portions each including first and second ends, said first ends of said first and second draw tube portions being coupled to said second ends of said first and second draw tubes, respectively, said second ends of said first and second draw tube portions extending inwardly of said first and second fuel tanks toward the bottom portion thereof, said first and second sending unit assemblies further including respective first and second float tubes and first and second float valves, said first and second float tubes being positioned proximate said second ends of said first and second draw tube portions and said first and second float valves being positioned interior of said first and second float tubes, said first and second float valves each including a submerged protion and a floating portion, said first and second float tubes extending substantially from said top portion to said bottom portion of said first and second fuel tanks so that said first and second float valves float substantially atop the liquid fuel in said first and second tanks with said submerged portions in contact with said liquid fuel so that said first and second float valves move along the length of said first and second float tubes in response to changes in the amount of liquid fuel in said first and second fuel tanks, said first and second float valves having first and second stoppers mounted to said submerged portions, said first and second float tubes each including a linear potentiometer mounted proximate said first and second float valves, said first and second float valves each including a magnetic contact mounted proximate said linear potentiometer to provide magnetic coupling between said linear potentiometer and said magnetic contact, said first and second sending unit assemblies further including respective first and second adapter valves wherein said first and second adapter valves each comprise substantially U-shaped members having first and second ends and a channel extending from said frist end to said second end, said first ends of said first and second adapter valves being coupled to said second ends of said first and second draw tube portions for conducting the liquid fuel in said first and second tanks to said first and second draw tube portions, said second ends of said first and second adapter valves being positioned in vertical alignment with said first and second float tubes and having a seat for receiving said first and second stoppers, said second ends of said first and second adapter valves being displaced slightly from said second ends of said first and second float tubes to define an inlet for conducting the liquid fuel from said first and second fuel tanks to said second ends of said first and second adapter valves, said second ends of said first and second adapter valves being slightly displaced from said lower portions of said first and second fuel tanks so that said first and second stoppers will seat within said second ends of said first and second adapter valves before all of the liquid fuel in the first and second fuel tanks is withdrawn thereby to prevent further withdrawal of the liquid fuel from said first and second fuel tanks; and means for determining the change in resistance of said potentiometers as a result of movement of said magnetic contacts to thereby determine the amount of liquid fuel remaining in said first and second fuel tanks.

2. A fuel tank system for a vehicle wherein the vehicle is of the type having a combustion engine for consuming a liquid fuel to provide motivating energy to the vehicle, said fuel tank system comprising:

first and second fuel tanks each constructed for storing the liquid fuel;

fuel conducting means for conducting fuel from said first and second fuel tanks to the combustion engine; and first and second valve means coupled respectively to said fuel conducting means for providing the liquid fuel from said frist and second fuel tanks to said fuel conducting means, said first and second valve means including respective first and second float valves constructed to float substantially atop the liquid fuel for sensing the level thereof to provide an electrical signal indicative of the amount of liquid fuel remaining in said first and second fuel tanks, said first and second float valves being constructed to automatically close said first and second valve means in response to the position of said first and second float valves so that air will not be drawn into the combustion engine.

3. The fuel tank system as recited in claim 2 wherein each of said first and second valve means comprises:

draw valve means for conducting the liquid fuel from said first and second tanks to said fuel conducting means, said first and second fuel tanks each having a top portion and a lower protion, said draw valve means including an open end positioned substantially proximate the lower portion of said first and second fuel tanks and opening toward the top portion of said first and second fuel tanks so that said open end is submerged in the liquid fuel; and float means for displacing a float valve in response to changes in the amount of liquid fuel in said first and second fuel tanks, said float means being vertically aligned with said open end of said draw valve means so that when the surface of the liquid fuel approaches said open end, said float valve is seated in said open end to block the flow of the liquid fuel to said draw valve means and thereby automatically close said first and second valve means.

4. The fuel tank system as recited in claim 3 wherein said float means further comprises sending unit means responsive to the displacement of said float valve for providing the electical signal indicative of the amount of liquid fuel remaining in said first and second fuel tanks.

5. The fuel tank system is recited in claim 3 wherein said float means further comprises:

an elongate float tube being positioned interior of said first and second fuel tanks and extending substantially from the top portion thereof to said open end of said draw valve means, said float valve being positioned interior of said elongate float tube for movement along the length thereof in response to changes in the amount of liquid fuel in said first and second fuel tanks;

a linear potentiometer mounted to said elongate float tube proximate said float valve;

a magnetic contact mounted to said float valve proximate said linear potentiometer to provide magnetic coupling between said linear potentiometer and said magnetic contact for providing the electrical signal indicative of the amount of liquid fuel remaining in said first and second fuel tanks.

6. The fuel tank system recited in claim 5 wherein said fuel conducting means further comprises means for conducting return fuel from the combustion engine to said first and second fuel tanks.

7. A fuel tank system for a vehicle wherein the vehicle is of the type having a combustion engine for consuming a liquid fuel to provide motivating energy to the vehicle, said fuel tank system comprising:

fuel tank means for storing the liquid fuel, said fuel tank means including a draw stem and means for conducting the liquid fuel from said draw stem to the combustion engine; and valve means coupled to said draw stem for regulating the flow of the liquid fuel to said draw stem, said valve means including a float valve constructed to float substantially atop the liquid fuel for sensing the level of the liquid fuel in said fuel tank means, said valve means being responsive to the sensed level for providing an electrical signal indicative of the amount of the liquid fuel remaining in said fuel tank means, said valve means being constructed for automatically blocking the flow of the liquid fuel to said draw stem before all of the liquid fuel in said fuel tank means is withdrawn so that air will not be drawn into the combustion engine.

8. The fuel tank system as recited in claim 7 wherein said valve means comprises:

draw valve means for conducting the liquid fuel to said draw stem, said fuel tank means having a top portion and a lower portion, said draw valve means including an open end positioned substantially proximate the lower portion of said fuel tank means and opening toward the top portion of said fuel tank means so that said open end is submerged in the liquid fuel; and float means for displacing a float valve in response to changes in the amount of liquid fuel in said fuel tank means, said float means being aligned with said open end of said draw valve means so that when the surface of the liquid fuel approaches said open end, said float valve is seated in said open end to block the flow of the liquid fuel to said draw valve means and thereby automatically close said valve means.

9. The fuel tank system as recited in claim 8 wherein said float means further comprises sending unit means responsive to the displacement of said float valve for providing the electrical signal indicative of the amount of liquid fuel remaining in said fuel tank means.

10. The fuel tank system as recited in claim 8 wherein said float means further comprises:

an elongate float tube being positioned interior of said fuel tank means and extending substantially from the top portion thereof to said open end of said draw valve means, said float valve being positioned interior of said elongate float tube for movement along the length thereof in response to changes in the amount of liquid fuel in said fuel tank means;

a linear potentiometer mounted to said elongate float tube proximate said float valve; and a magnetic contact mounted to said float valve proximate said linear potentiometer to provide magnetic coupling between said linear potentiometer and said magnetic contact for providing the electrical signal indicative of the amount of liquid fuel remaining in said fuel tank means.

11. Apparatus for a fuel tank of a vehicle wherein the vehicle is of the type having a combustion engine for consuming a liquid fuel to provide motivating energy to the vehicle, and a fuel line system for conducting the liquid fuel from the fuel tank to the combustion engine, said fuel tank comprising:

a draw stem for conducting the liquid fuel from the fuel tank to the fuel line system, said draw system including valve means for regulating the flow of the liquid fuel to said draw stem; and float means for determining the level of the liquid fuel in the fuel tank, said float means being constructed to provide an electrical signal to identify the level of liquid fuel in the tank, said float means being further constructed to mate with said valve means when the level of fuel reaches a predetermined level to automatically prevent the flow of liquid fuel to said draw stem.

12. The fuel tank system as recited in claim 11 wherein said float means further comprises:

an elongate float tube being positioned interior of said fuel tank means and extending substantially from the top portion thereof to said valve means, said float valve being positioned interior of said elongate float tube for movement along the length thereof in response to changes in the amount of liquid fuel in the fuel tank;

a linear potentiometer mounted to said elongate float tube proximate said float valve; and a magnetic contact mounted to said float valve proximate said linear potentiometer to provide magnetic coupling between said linear potentiometer and said magnetic contact for providing the electrical signal indicative of the amount of liquid fuel remaining in said fuel tank means.

* * * * *

UNITED STATES PATENT AND TRADEMARK OFFICE
CERTIFICATE OF CORRECTION

PATENT NO. : 5,201,298
DATED : April 13, 1993
INVENTOR(S) : Kenneth M. Shearn

It is certified that error appears in the above-indentified patent and that said Letters Patent is hereby corrected as shown below:

Column 6, Claim 1, Line 9, delete "protion" and insert --portion--
              Line 33, delete "frist" and insert --first--
Column 7, Claim 2, Line 6, delete "frist" and insert --first--
          Claim 3, Line 23, delete "protion" and insert --portion--

Signed and Sealed this

Fourteenth Day of December, 1993

Attest:

BRUCE LEHMAN

Attesting Officer        Commissioner of Patents and Trademarks